(12) United States Patent
Ebbeke

(10) Patent No.: US 10,953,422 B2
(45) Date of Patent: Mar. 23, 2021

(54) VESSEL COMPRISING A THERMOCHROMIC INDICATOR COATING

(71) Applicant: FISSLER GMBH, Idar-Oberstein (DE)

(72) Inventor: Helge Ebbeke, Idar-Oberstein (DE)

(73) Assignee: FISSLER GMBH, Idar-Oberstein (DE)

( * ) Notice: Subject to any disclaimer, the term of this patent is extended or adjusted under 35 U.S.C. 154(b) by 0 days.

(21) Appl. No.: 15/781,665

(22) PCT Filed: Sep. 23, 2016

(86) PCT No.: PCT/EP2016/072661
§ 371 (c)(1),
(2) Date: Jun. 5, 2018

(87) PCT Pub. No.: WO2017/102123
PCT Pub. Date: Jun. 22, 2017

(65) Prior Publication Data
US 2018/0360263 A1 Dec. 20, 2018

(30) Foreign Application Priority Data
Dec. 18, 2015 (DE) ...................... 10 2015 122 203.5

(51) Int. Cl.
*B05B 12/00* (2018.01)
*A47J 36/02* (2006.01)
*A47J 45/06* (2006.01)

(52) U.S. Cl.
CPC ............ *B05B 12/004* (2013.01); *A47J 36/02* (2013.01); *A47J 36/022* (2013.01); *A47J 36/025* (2013.01); *A47J 45/068* (2013.01)

(58) Field of Classification Search
CPC ...................................... A47J 36/02

USPC ................................... 220/573.1, 573.3, 752
See application file for complete search history.

(56) References Cited

U.S. PATENT DOCUMENTS

| 4,156,365 A | 5/1979 | Heinmets et al. |
| 6,551,693 B1 * | 4/2003 | Buffard ............... G01K 11/12 |
| | | 99/342 |
| 7,487,882 B2 * | 2/2009 | Ferron ................. A47J 45/068 |
| | | 220/573.1 |

(Continued)

FOREIGN PATENT DOCUMENTS

| CN | 1040553 A | 3/1990 |
| CN | 1745691 A | 3/2006 |

(Continued)

OTHER PUBLICATIONS

International Search Report dated Nov. 11, 2016 re: Application No. PCT/EP2016/072661, pp. 1-2, citng: US 2006/081639 A1 and EP 1 632 159 A1.

(Continued)

*Primary Examiner* — J. Gregory Pickett
*Assistant Examiner* — Tia Cox
(74) *Attorney, Agent, or Firm* — Cantor Colburn LLP

(57) ABSTRACT

A vessel for frying, baking or cooking foodstuffs, includes at least one visible first material and one visible second material, wherein at least the first material reversibly changes color thermochromically when heated. The coloring of the two materials is selected in order for a color difference between the two materials to change visibly when the vessel is heated.

6 Claims, 1 Drawing Sheet

(56) References Cited

U.S. PATENT DOCUMENTS

| | | | | |
|---|---|---|---|---|
| 2006/0049176 | A1* | 3/2006 | Ferron | G01K 1/14 |
| | | | | 219/621 |
| 2006/0081639 | A1* | 4/2006 | Lazaroff | A47J 27/212 |
| | | | | 220/573.1 |
| 2007/0068936 | A1* | 3/2007 | Wu | A47J 45/068 |
| | | | | 219/687 |
| 2010/0181322 | A1* | 7/2010 | Perillon | C09D 183/04 |
| | | | | 220/573.2 |
| 2012/0052265 | A1 | 3/2012 | Le Bris et al. | |
| 2012/0312822 | A1* | 12/2012 | Cheng | A47J 45/068 |
| | | | | 220/573.1 |
| 2013/0320024 | A1* | 12/2013 | Perillon | B05D 3/207 |
| | | | | 220/573.2 |
| 2014/0326733 | A1* | 11/2014 | Park | A47J 36/06 |
| | | | | 220/573.1 |
| 2015/0282258 | A1* | 10/2015 | Park | H05B 6/6408 |
| | | | | 219/731 |
| 2016/0368261 | A1* | 12/2016 | Le Bris | B41M 7/0054 |
| 2017/0158879 | A1* | 6/2017 | Le Bris | C09D 1/00 |

FOREIGN PATENT DOCUMENTS

| | | |
|---|---|---|
| CN | 201758748 U | 3/2011 |
| CN | 203815213 U | 9/2014 |
| DE | 7734023 U1 | 6/1978 |
| DE | 202010001501 U1 | 5/2010 |
| EP | 1632159 A1 | 3/2006 |
| EP | 2002767 A1 * 12/2008 ............ A47J 36/02 |
| FR | 2784459 A1 | 4/2000 |
| FR | 2963098 A1 | 1/2012 |
| GB | 1014080 A | 12/1965 |
| JP | H0311856 U | 3/1991 |

OTHER PUBLICATIONS

Third Party Observation issued Oct. 16, 2017 re: Application No. PCT/EP2016/072661, pp. 1-2, citing: US 2012/0052265 A1 and U.S. Pat. No. 6,551,693 B1.

Third Party Observation issued Apr. 18, 2018 re: Application No. PCT/EP2016/072661, pp. 1-4, citing: GB 1,014,080 A, FR 2 784 459 A1, FR 2 963 098 A and U.S. Pat. No. 4,156,365 A.

CN Office Action dated Nov. 3, 2020 re: Application No. 201680074301.6, pp. 1-10.

* cited by examiner

VESSEL COMPRISING A THERMOCHROMIC INDICATOR COATING

TECHNICAL FIELD

The present disclosure relates to a vessel for frying, baking or cooking of food having at least a visible first material and a visible second material, wherein at least the first material reversibly changes color thermochromically when heated.

The disclosure in particular refers to pans or pots, but is also suitable for other vessels to be heated or warmed up. These are known and usually made of metal (for example stainless steel or aluminum) and plastic, wherein usually the plastic due to its poor heat conduction forms the handle(s) and the actual vessel body is made of metal. Increasingly, materials are being used that allow an inductive heating of the vessel. The disclosure refers both to inductive heatable or non-inductive heatable vessels. The disclosure is also suitable for use with ceramic (sol-gel).

BACKGROUND

Frying or baking good that is to be prepared in a pan, for example, should often only be put on the pan when it has reached a certain temperature. However, this is often difficult because the respective temperature of the pan is not visually recognizable. Particularly often this problem exists when there is no oil or fat in the pan which is often the case, especially with pans which are provided with a coating made of polytetrafluorethylene PTFE (Teflon®).

This problem is solved in the state of the art by various measures. On the one hand, thermometers are known which can be placed on the bottom of the pan and display the temperature. But there are also known vessels which have a thermochromic element which can reversibly change color.

For example US 2012 0312 822 A1 shows a pan, in whose pan-handle an area with thermochromic color is arranged. This is changing when the pan is heated so that the user, through the color change, gets a hint to the temperature of the bottom of the pan. A similar device is shown by the German utility model GM 7734023. Also in this case an area which is not covered with cooking good, preferably the handle of the pan, is provided with a thermochromic element.

The utility model DE 20 2010 001 501 U1 shows a vessel for cooking, baking and frying of food at which thermochromic material is arranged at these outer shell surface. A missing coating on the vessel bottom shall prevent that the contact to the bearing surface is shielded. Inside the vessel the optimum coating for the cooking, frying or baking process can be selected. The full-surface coating of the shell outer surface of the vessel allows to recognize the color change clear and quickly from any angle of view.

The disadvantage of said pans and the vessel is among others that the thermochromic element and the thermochromic color, respectively, does not show the actual temperature of the bottom of the pan, but is merely thermally-conductive connected with the bottom of the pan. If the heat conduction is interrupted or disturbed false indications may occur.

The described embodiments from the state of the art also have the disadvantage that the user has to know what the thermochromic element must look like when the optimum temperature is reached. The respective color change must attract the user's attention why he has to observe the thermochromic element during the heating process in case of doubt. Especially in case of long periods of non-use of the vessel it can happen that the user no longer knows which color change occurs when the pan is warmed up.

SUMMARY

The object of the disclosure is to suggest a vessel for frying, baking or cooking of food which is as easy to use as possible. Especially the user shall be able to record the reached temperature of the pan as quickly and directly as possible.

According to the disclosure the object is solved by a vessel for frying, baking or cooking of food, the vessel comprising at least a visible first material and a visible second material, wherein at least the first material reversibly changes color thermochromically when heated, wherein the color of one of the two materials serves as a reference color for the respective other material, wherein a color difference between the two materials changes visibly when the vessel is heated.

According to that the vessel at least comprises a first material which reacts thermochromically reversible while the second material does not change color. The coloring of the two materials is selected so that by comparing the colors of the two materials with each other it is recognizable in which temperature range the temperature of the vessel is.

In other words, it is no longer necessary for the user to know the color change of the thermochromic materials. He merely has to compare the arising color of the thermochromic material with the color of the other materials. The non-thermochromic other material serves as a reference color for the material which changes color thermochromically, so to speak.

In the following the terms pan or pot are synonymously used for all vessels suitable for the disclosure. Insofar the terms pan or pot are not to be understood as restrictive.

In a particularly simple and targeted embodiment the second material which does not change its color thermochromically already in the cold basic state comprises a color which arises on the material which can change color thermochromically when it has reached the desired temperature. This results in two different colors being recognizable in the cold basic state of the vessel which however are no more or hardly distinguishable from each other in the desired temperature range. Visually, the color difference disappears, so to speak, which is quick and easy recognizable for the user. Possible is an erratic quick color change, but also conceivable is that the colors increasingly converge when the vessel is heated.

According to the disclosure it may also be provided that in the cold basic state of the vessel no color difference between the first material and the second material is recognizable, but it arises when heated.

According to the disclosure it may be provided that one of the materials is applied to the vessel in the form of alpha-numeric characters. Especially a lettering may be provided, for example, which gives a hint to the temperature. In one embodiment for example the word "hot" or "hot" may appear when the vessel has reached the desired temperature. Vice versa the word "cold" or "cold" may be visible as long as the vessel has not yet reached the desired temperature or the desired temperature range. Alternatively or additionally easily recognizable symbols may also be used.

Alternatively is also conceivable that a reference field with a kind of color gradient is applied to the vessel and adjacent to this color gradient thermochromic material is arranged. The discoloration of the thermochromic material depends on the increasing temperature so that based on the color gradient which cannot thermochromically change color it is recognizable in which temperature range the vessel is currently when heated. Also during heating numbers each indicating a temperature range in which the vessel is currently located may become visible or stay visible.

In a particularly simple embodiment the vessel, preferably a pan, comprises a continuous coating of thermochromic material inside it. Additionally the vessel interior is provided with areas of non-thermochromic material spread over the surface. These areas, for example color speckles, have the color that the first Material which reversibly changes color thermochromically takes on, when the desired temperature range is reached. Visually the bottom of the pan and possibly also the inner pan edge is thus provided with visible color speckles in the cold basic state. If the pan is heated, these increasingly disappear until the pan shows a consistent, uniform coloring in the desired temperature range. Alternatively, the reverse arrangement is also conceivable. The vessel or pan then has a continuous uniform coloring in the cold basic state. By heating the thermochromic areas or speckles change so that the pan is then bicolored when it has reached the desired temperature range.

The disclosure is particularly suitable for baking trays. Although these are usually not referred to as vessels, it is explicitly pointed out that the term in the sense of the disclosure also refers to baking trays. Baking trays anyway can be used as vessel, for example for cakes. With baking trays the problem often occurs that these are still located in the oven that has already been switches off, but are still hot. This in turn can cause the user to burn himself when attempting to remove the hot baking trays. For this reason, the use of two different materials according to the disclosure can also be used here, for example to generate a clearly visible warning when the baking tray is still hot. For example, an alphanumeric character or also the warning "hot" is easily recognizable as long as the baking tray is hot. Conversely, a notice may also become visible when the baking tray is cold enough again.

As particularly suitable temperature range for pans for example as the beginning of the color change 60° C. to 100° C. and as the end of the color change 80° C. to 250° C. have proven to be particularly favourable. But the color ranges depending on the selection of the thermochromic materials may also have other, in particular narrower, limits.

According to the disclosure a structure of a layer system based on PTFE may be constructed as follows:
1. Primary layer
   ensures adhesion of the non-stick layer to the substrate.
2. Middle layer
   reinforces the system,
   has a high non-stick content,
   is preferably designed completely thermochromic.
3. Reference layer
   is for example sprayed on in the form of speckles,
   represents a reference color for the thermochromic color change of the middle layer.
4. Top layer
   non-stick layer,
   transparent, translucent.

This structure has proven to be purposeful and practicable, deviations, additions or adaptations are of course possible. Especially, the top layer can also be dispensed with. In order to recognize the temperature, a thermochromic material is thus introduced into the non-stick system of the vessel. In doing so, the middle layer which is recognizable through the transparent top layer is designed thermochromic. Under the influence of heat, the middle layer changes its color. A reference color in the form of speckles is applied to the middle layer. In the cold state of the pan the speckles are clear recognizable due to the color difference to the middle layer. When the pan is heated the color of the middle layer changes. This makes the speckles barely perceptible, they disappear optically. When the pan cools down, the speckles become visible again.

BRIEF DESCRIPTION OF THE DRAWINGS

The disclosure is explained in more detail on the basis of the following figures. These are only to be understood as examples and are not intended to limit the disclosure to the embodiments shown, wherein.

DETAILED DESCRIPTION OF THE DRAWINGS

Figure 1:
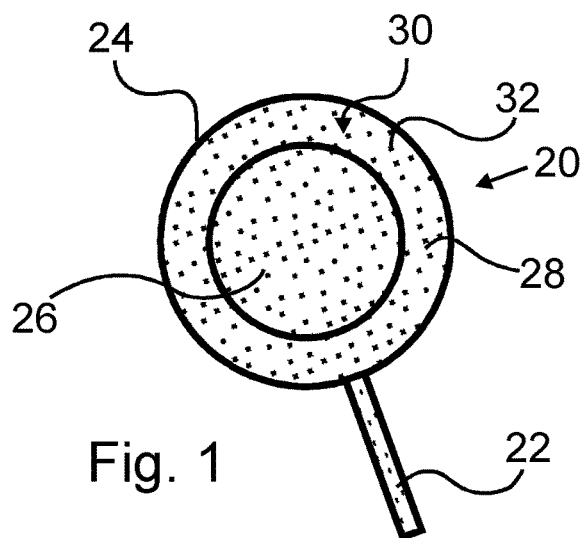
FIG. 1: shows a pan according to the disclosure in the cold basic state.

FIGS. 1 to 5 show a vessel 20 according to the disclosure, here a pan, from above. Recognizable is a handle 22 and a vessel body 24. The vessel body 24 comprises a bottom 26 and an edge 28.

FIG. 1 shows the vessel 20 in the cold basic state. Recognizable is a first material 30 and a second material 32. The first material 30 covers in the shown embodiment the entire surface of the interior of the vessel body 24, while the second material 32 is applied only in certain areas in form of speckles or small-area areas. The first material 30 is thermochromically reversible and changes color with increasing heating. The second material 32 is however not thermochromic and has a color which the first material 30 takes on when it is heated up to a certain temperature range.

Figure 2:
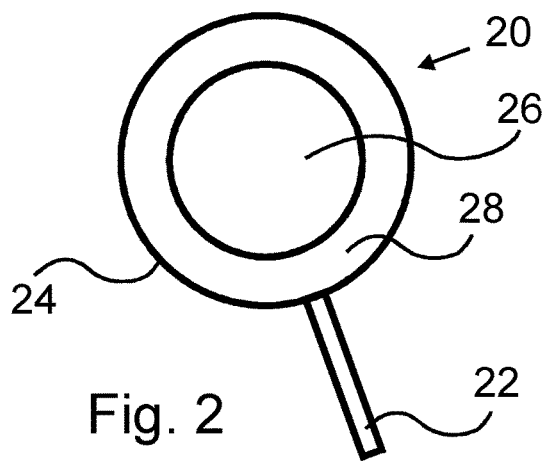
FIG. 2: shows the pan from FIG. 1 in the heated state.

FIG. 2 illustrates the state of the vessel 20 when it has been heated to the point where it has reaches the desired temperature range. The previously visible areas or speckles of the second material 32 are no longer visible, as the color difference between the first material 30 and the second material 32 no more or hardly exists. While the first material 30 changes color thermochromically, the second material 32 retains its color.

As already mentioned, an reverse arrangement of the two materials 30, 32 may also be provided. According to that the base area of the vessel 20 would not be thermochromic and the small-area areas or speckles of the second material 32 would change color.

Figure 3:
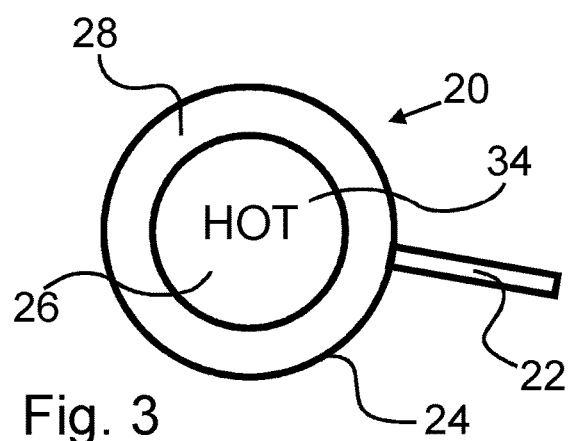
FIG. 3 shows a second embodiment of a pan according to the disclosure.

FIG. 3 shows an embodiment where alphanumeric characters 34 are used. In the embodiment shown the vessel 20 is warmed up, by what a color difference between the first material 30 and the second material 32 arises, so that the lettering "hot" is clear recognizable.

Figure 4:
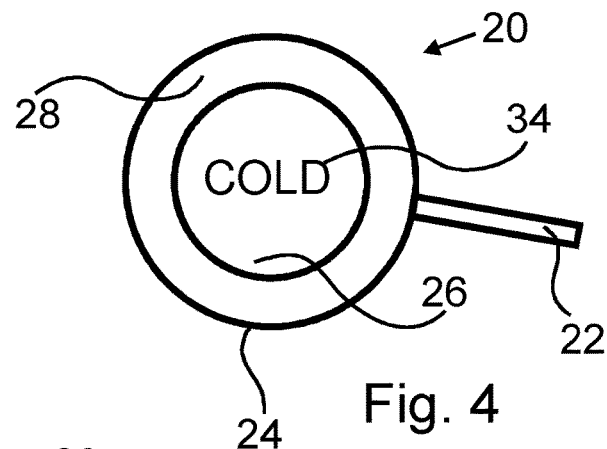
FIG. 4 shows a third embodiment of a pan according to the disclosure.

FIG. 4 however shows a reverse example in which a color difference between the first material 30 and the second material 32 arises when the vessel 20 is located in the cold basic state. Recognizable is the lettering "cold" which optically disappears when the pan is heated.

Figure 5:
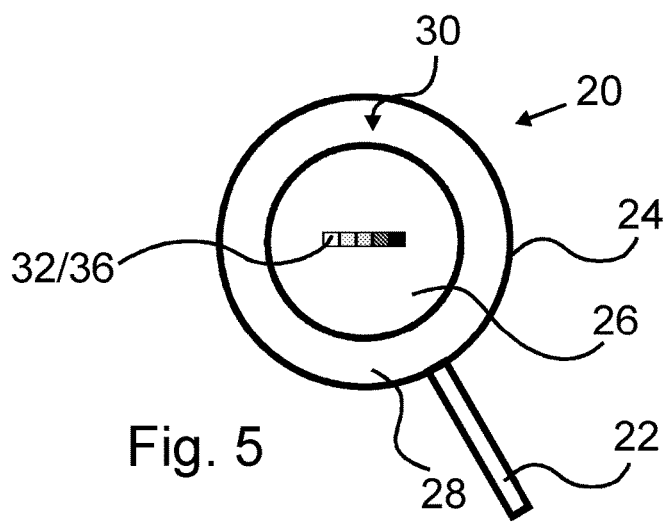
FIG. 5 shows a fourth embodiment of a pan according to the disclosure.

FIG. 5 shows an embodiment in which the temperature change during the heating process is recognizable. In a reference field 36 a color gradient is shown, in the embodiment shown fields or areas in row. The reference field 36 has different color ranges each corresponding to a temperature-dependent discoloration of the thermochromic material. In the embodiment shown the first material 30 is again thermochromic and covers at least the bottom 26. The reference field 36 is made of non-thermochromic material 32. Thereby, each field within the reference field 36 represents a certain temperature range with regard to the coloring. If the vessel 20 is now heated, the color of the second material 30 changes continuously, for example from a light red hue to a dark red hue. The reference field 36 for different temperature ranges, for example 0 to 50° C., 50 to 100° C., 100 to 150° C., 150 to 200° C. and more than 200° C., has the respective red shade of the thermochromic material 30. Thus this allows a user to recognize at first glance which temperature the vessel 20 or the pan actually has. The reference field 36 is arranged on the bottom 26 in the embodiment shown, but preferably it may also be provided near the edge 28. Also conceivable is the use of several reference fields 36, for example in the bottom 26 and in the edge 28.

The vessel 20 may be made of different materials, for example of stainless steel, aluminum or any other material suitable for a coating.

According to the disclosure merely the bottom 26 may have the two materials 30, 32, but advantageously also the edge 28 has the two materials 30, 32. This is particularly useful because the bottom 26 is often completely covered with frying good.

The disclosure is not limited to the described and shown embodiments, but there are numerous other possible applications. It is essential that the color differences of the two materials 30, 32 are used to make arising temperature ranges visible.

The invention claimed is:

1. A vessel for frying, baking or cooking of food having at least a visible first material and a visible second material, wherein at least the first material reversibly changes color thermochromically when heated, wherein the color of one of the two materials serves as a reference color for the respective other material, wherein a color difference between the two materials changes visibly when the vessel is heated, wherein a color difference between the two materials in a first temperature range corresponding to a cold basic state of the vessel is high, and in a second temperature range corresponding to a desired temperature range in the heated state of the vessel is low such that the color difference between the two materials disappears, wherein a bottom of the vessel and an inner edge of the vessel comprise the two materials, wherein one of the first and second materials covers the bottom of the vessel and the other of the first and second materials covers only a portion of the one material such that the color difference is visible simultaneously.

2. The vessel according to claim 1, wherein an alphanumeric character is recognizable in the first temperature range corresponding to the cold basic state of the vessel and is little or no recognizable in the second temperature range.

3. The vessel according to claim 1, wherein an alphanumeric character is little or no recognizable in the first temperature range corresponding to the cold basic state of the vessel and is recognizable in the second temperature range of the vessel.

4. The vessel according to claim 1, wherein the vessel comprises a reference field over which different temperature ranges during heating or cooling of the vessel due to changing color differences of the two materials are readable.

5. The vessel according to claim 1, wherein the middle is configured to be completely thermochromic and the upper layer is sprayed on in the form of speckles.

6. The vessel according to claim 1, wherein the first material covers the entire surface of the bottom of the vessel and the second material covers a plurality of areas in a form of speckles.

* * * * *